United States Patent
Breebaart et al.

(10) Patent No.: US 10,659,880 B2
(45) Date of Patent: May 19, 2020

(54) METHODS, APPARATUS AND SYSTEMS FOR ASYMMETRIC SPEAKER PROCESSING

(71) Applicants: Dolby Laboratories Licensing Corporation, San Francisco, CA (US); DOLBY INTERNATIONAL AB, Amsterdam Zuidoost (NL)

(72) Inventors: Dirk Jeroen Breebaart, Ultimo (AU); Mark David de Burgh, Mount Colah (AU); Nicholas Luke Appleton, Bellevue Hill (AU); Heiko Purnhagen, Sundbyberg (SE); Mark William Gerrard, Balmain (AU); David Matthew Cooper, Carlton (AU)

(73) Assignees: Dolby Laboratories Licensing Corporation, San Francisco, CA (US); Dolby International AB, Amsterdam Zuidoost (NL)

( * ) Notice: Subject to any disclaimer, the term of this patent is extended or adjusted under 35 U.S.C. 154(b) by 0 days.

(21) Appl. No.: 16/191,123

(22) Filed: Nov. 14, 2018

(65) Prior Publication Data

US 2019/0158957 A1 May 23, 2019

Related U.S. Application Data

(60) Provisional application No. 62/589,307, filed on Nov. 21, 2017.

(30) Foreign Application Priority Data

Mar. 21, 2018 (EP) .................................. 18163056

(51) Int. Cl.
*H04R 5/02* (2006.01)
*H04R 3/14* (2006.01)
(Continued)

(52) U.S. Cl.
CPC ................ *H04R 3/14* (2013.01); *H04M 1/03* (2013.01); *H04M 1/6016* (2013.01); *H04R 3/04* (2013.01);
(Continued)

(58) Field of Classification Search
CPC ... H04R 3/12; H04R 3/14; H04R 3/04; H04R 3/06; H04R 3/08; H04R 5/02; H04R 5/04;
(Continued)

(56) References Cited

U.S. PATENT DOCUMENTS 6,243,476 B1 * 6/2001 Gardner ................. H04S 1/007
381/1
7,346,315 B2 3/2008 Zurek
(Continued)

FOREIGN PATENT DOCUMENTS

JP 2006-166110 6/2006
JP 2008-160265 7/2008
(Continued)

*Primary Examiner* — Leshui Zhang

(57) ABSTRACT

A method of processing audio data for replay on a mobile device with a first speaker and a second speaker, wherein the audio data comprises a respective audio signal for each of the first and second speakers, includes: determining a device orientation of the mobile device; if the determined device orientation is vertical orientation, applying a first processing mode to the audio signals for the first and second speakers; and if the determined device orientation is horizontal orientation, applying a second processing mode to the audio signals for the first and second speakers. Applying the first processing mode involves: determining respective mono audio signals in at least two frequency bands based on the audio signals for the first and second speakers; in a first one of the at least two frequency bands, routing a larger portion of the respective mono audio signal to one of the first and second speakers; and in a second one of the at least two (Continued)

frequency bands, routing a larger portion of the respective mono audio signal to the other one of the first and second speakers. Applying the second processing mode involves applying cross-talk cancellation to the audio signals for the first and second speakers.

20 Claims, 13 Drawing Sheets

(51) Int. Cl.
H04R 5/04 (2006.01)
H04S 1/00 (2006.01)
H04M 1/03 (2006.01)
H04M 1/60 (2006.01)
H04R 3/04 (2006.01)
H04S 3/00 (2006.01)
H04S 7/00 (2006.01)

(52) U.S. Cl.
CPC .............. *H04R 5/02* (2013.01); *H04R 5/04* (2013.01); *H04S 1/002* (2013.01); *H04S 3/008* (2013.01); *H04S 7/30* (2013.01); *H04R 2205/022* (2013.01); *H04R 2420/01* (2013.01); *H04R 2499/11* (2013.01); *H04S 2400/01* (2013.01); *H04S 2400/03* (2013.01)

(58) Field of Classification Search
CPC ........ H04M 1/03; H04M 1/6016; H04M 1/64; H04M 1/6033; H04M 1/6041; H04M 1/605; H04M 1/6075; H04M 1/62; H04S 7/00; H04S 7/30; H04S 7/301; H04S 7/302; H04S 7/303; H04S 7/305; H04S 7/307; H04S 7/308; H04S 7/40; H04S 2400/01; H04S 2400/03; H04S 2400/05; H04S 2400/07; H04S 2400/09; H04S 2400/13; H04S 2400/15; H04S 2420/00; H04S 2420/01; H04S 2420/07; H04S 2420/11; H04S 2420/13; H04S 3/008; H04S 3/02; H04S 3/006; H04S 3/16; H04S 3/162; H04S 3/165; H04S 3/167; G06F 16/60; G06F 16/61; G06F 16/632; G06F 16/634; G06F 16/635; G06F 16/636; G06F 16/637; G06F 16/638; G06F 16/639; G06F 16/64
USPC ....... 381/300, 303, 304, 305, 306, 307, 308, 381/27, 77, 79, 80, 81, 85, 89, 332, 333, 381/334, 96, 97, 98, 99, 100, 101, 102, 381/103, 119, 111, 116, 117, 123, 120; 455/3.06, 41.1, 569.1, 569.2, 575.3, 455/575.4; 700/94
See application file for complete search history.

(56) References Cited

U.S. PATENT DOCUMENTS

| | | |
|---|---|---|
| 7,606,380 B2 | 10/2009 | Melanson |
| 7,801,317 B2 | 9/2010 | Kim |
| 7,945,054 B2 | 5/2011 | Kim |
| 8,879,761 B2 | 11/2014 | Johnson |
| 8,891,782 B2 | 11/2014 | Kim |
| 9,036,841 B2 | 5/2015 | De Bruijn |
| 9,357,309 B2 | 5/2016 | Meyer |
| 9,398,391 B2 | 7/2016 | Yang |
| 9,456,277 B2 | 9/2016 | Burlingame |
| 9,607,626 B1 | 3/2017 | Yang |
| 2007/0019812 A1* | 1/2007 | Kim ..................... H04S 1/00 381/17 |
| 2013/0279706 A1* | 10/2013 | Marti ................ G06F 3/165 381/57 |
| 2016/0249151 A1* | 8/2016 | Grosche ............. H04S 1/002 |
| 2016/0381487 A1* | 12/2016 | Harvey ................ H04R 5/04 381/303 |
| 2017/0026772 A1 | 1/2017 | Doy |
| 2017/0257725 A1 | 9/2017 | Sapozhnykov |
| 2017/0265017 A1 | 9/2017 | Katayama |

FOREIGN PATENT DOCUMENTS

| | | |
|---|---|---|
| JP | 2008160265 A * | 7/2008 |
| KR | 2006-0034444 | 4/2006 |
| WO | 2012/145828 | 11/2012 |
| WO | 2016/033358 | 3/2016 |
| WO | 2018/132417 | 7/2018 |

* cited by examiner

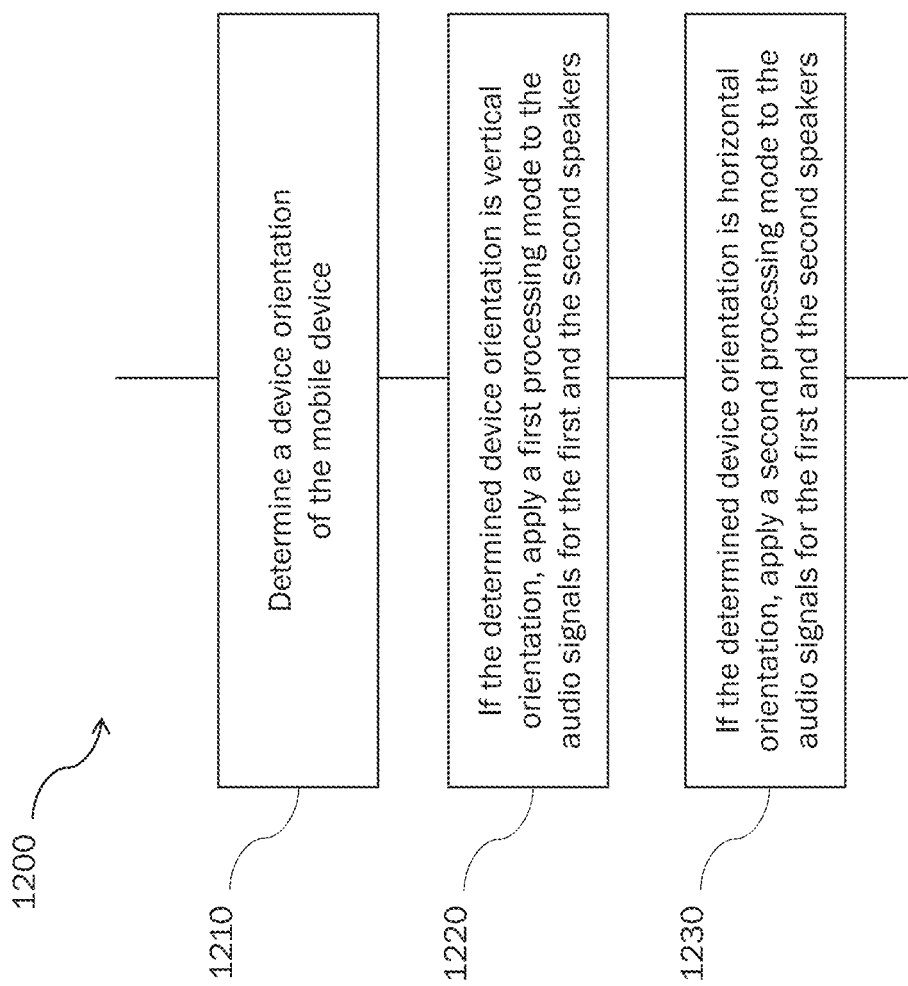

METHODS, APPARATUS AND SYSTEMS FOR ASYMMETRIC SPEAKER PROCESSING

CROSS REFERENCE TO RELATED APPLICATIONS

This Application is related to U.S. Provisional Patent Application No. 62/589,307 filed on Nov. 21, 2017 and European Patent Application No. 18163056.7 filed on Mar. 21, 2018, the contents of which are hereby incorporated herein by reference for all purposes as if fully set forth herein.

TECHNICAL FIELD

The present disclosure relates to asymmetric speaker layouts and to audio processing in such asymmetric speaker layouts.

BACKGROUND

Major vendors have made commercially available stereo speakers and stereo playback capabilities in mobile phones. The layout of mobile phone stereo speaker(s) are often asymmetric due to cost saving and design aesthetics. An example of an asymmetric layout comprises of (i) a small speaker at the top of the phone (e.g., an ear speaker) mounted parallel to a screen, and (ii) a second (main) speaker at the bottom of the phone facing downwards. However, such speaker layout(s) are acoustically challenging, including because:

the frequency magnitude response of both speakers can be substantially different, thereby negatively influencing the perceived spatial imaging of stereo or multi-channel content;

there are difficulties in order to correctly execute cross-talk cancellation algorithms for stereo widening and virtualization of multi-channel content or object-based content (e.g., Dolby Atmos) because these types of content are typically based on the assumption of a symmetric speaker layout;

the orientation and position dependency (e.g., when the phone is handheld v. put on a hard surface like a table) of the frequency responses may change the listening experience dramatically;

the frequency-dependent phase response of both speakers can vary considerably, negatively impacting the perceived stereo and virtualization imaging;

when the phone is held vertically (e.g. in portrait mode), there may be sub-optimal playback in terms of achieving maximum loudness if the speaker capabilities are vastly different and/or frequency dependent.

Speaker correction typically involves applying static or dynamic correction filter(s) that are common to both speaker drivers. Such correction filter(s) are directed to modifying a perceived timbre by amplifying frequencies that are reproduced at relatively low levels of sound pressure. The filters are typically derived from measured frequency responses of the loudspeakers, followed by an optimization or tuning algorithm that computes a correction filter with the aforementioned goal of improving the perceived timbre. However, there are several limitations to such solutions:

unless the correction filters are allowed to be different for the two drivers, spatial imaging for asymmetric speaker layouts will not improve by applying a (common) correction filter;

the frequency response of two drivers with one common correction filter cannot be optimally used, (e.g., if one driver efficiently reproduces high frequencies, while the second driver is more capable in reproducing low frequencies, trying to play all frequencies equally by both drivers can give suboptimal results);

correction filters are typically zero, linear or minimum-phase filter designed to reduce complexity and memory requirements and hence phase difference compensation is not included, which can degrade the perceived spatial image of audio played over the two speakers;

correction filters are independent of use case(s) and are not personalized nor device-orientation/position dependent (e.g., if the phone is placed on a hard, flat surface such as a table, the effective frequency response of at least one of the drivers may change significantly); hence any static correction filters will typically be suboptimal in at least one use case for which the correction filters were not designed;

speaker virtualization by means of cross-talk cancellation may be enabled even when a device is held in portrait mode, compromising loudness and timbre but without any spatial benefit;

one or more speakers may be (partially) covered by the user (for example by the hand holding the phone) introducing a change in the frequency response of that particular speaker. Conversely, a user may use a hand to improve the response of a loudspeaker. No prior solution has means to detect such changes or accordingly adjust a device processing algorithm.

Thus, there is a need for improved processing of audio data for replay on mobile devices. There is particular need for such improved processing of audio data for replay on mobile devices with asymmetric speaker configurations.

SUMMARY

The present invention provides a method of processing audio data, a mobile device, a computer program, and a computer-readable storage medium having the features of the respective independent claims.

An aspect of the disclosure relates to a method of processing audio data for replay on a mobile device with a first speaker and a second speaker. The audio data may include a respective audio signal for each of the first and second speakers. The first and second speakers may be different from each other. The method may include determining a device orientation of the mobile device. The method may further include, if the determined device orientation is vertical orientation, applying a first processing mode to the audio signals for the first and second speakers. The method may further include, if the determined device orientation is horizontal orientation, applying a second processing mode to the audio signals for the first and second speakers. Vertical orientation may also be referred to as portrait mode. Horizontal orientation may also be referred to as landscape mode. The method may further include receiving the audio data, such as from a bitstream, for example. Applying the first processing mode may involve determining respective mono audio signals in at least two frequency bands based on the audio signals for the first and second speakers. Applying the first processing mode may further involve, in a first one of the at least two frequency bands, routing (e.g., sending) a larger portion of the respective mono audio signal to one of the first and second speakers. Applying the first processing mode may further involve, in a second one of the at least two frequency bands, routing a larger portion of the respective mono audio signal to the other one of the first and second speakers. Applying the second processing mode may involve applying cross-talk cancellation to the audio signals for the first and second speakers.

A typical asymmetric speaker layout comprising of an ear speaker and main speaker will exhibit different frequency responses across the two drivers. In particular, the main speaker is typically more efficient and capable in reproducing low-frequency content, while the opposite can be true for high-frequency content. In order to produce a maximum loudness while minimizing the amount of electric and/or digital power required, it is beneficial in portrait mode to split the signal(s) to be reproduced by the two drivers in at least two (or more) frequency bands. A low-frequency band can be reproduced by the main speaker, while the high-frequency band can be reproduced by the ear speaker. On the other hand, portrait mode typically cannot profit from cross-talk cancellation, and cross-talk cancellation may even deteriorate sound quality when in portrait mode. However, when the device is positioned in an landscape orientation, the addition of cross-talk cancellation (often with coupled virtualization) can greatly improve the perceived width and immersiveness of the output sound. In consequence, the proposed method can improve the perceived sound quality regardless of an orientation of the device.

In some embodiments, the second processing mode may further involve applying a multi-band dynamic range compressor (DRC), peak limiter, RMS limiter, or signal limiter to the audio signals after cross-talk cancellation. This may be done to keep the audio signals in the linear range(s) of the first and second speakers.

In some embodiments, applying the multi-band dynamic range compressor, peak limiter, RMS limiter, or signal limiter to the audio signals after cross-talk cancellation may involve applying gains that are coupled between respective audio signals after cross-talk cancellation, at least over a range of frequencies.

In some embodiments, the second processing mode may involve bypassing cross-talk cancellation for low frequencies. This may be done to improve loudness, timbre and/or audio quality.

In some embodiments, bypassing cross-talk cancellation for low frequencies may involve determining a mono audio signal in a low frequency band based on the audio signals for the first and second speakers. Determining the mono audio signal in the low frequency band may involve low-pass filtering of the audio signals and applying a mono downmix to the low-pass filtered audio signals (or vice versa). Bypassing cross-talk cancellation for low frequencies may further involve routing the mono audio signal in the low frequency band to a main speaker among the first and second speakers. On the other hand, cross-talk cancellation may be applied to high-pass filtered audio signals. Thereby, overall loudness and sound quality can be improved since low frequencies have been found to not much profit from cross-talk cancellation.

In some embodiments, the second processing mode may involve applying a first correction filter to that audio signal after cross-talk cancellation that is routed to the one of the first and second speakers. The second processing mode may further involve applying a second correction filter to that audio signal after cross-talk cancellation that is routed to the other one of the first and second speakers. The first correction filter may be different from the second correction filter. By applying speaker-specific correction filters to the first and second speakers, optimum use of the two speakers can be achieved, together with a faithful rendering of the audio content, possibly in accordance with an artistic intent.

In some embodiments, the second processing mode may involve extracting a center channel from the audio signals for the first and second speakers. The second processing mode may further involve bypassing cross-talk cancellation for the extracted center channel. This may be done to improve loudness, timbre and/or quality.

In some embodiments, in the first processing mode, determining the respective mono audio signals in the at least two frequency bands may involve downmixing the audio signals for the first and second speakers to a mono audio signal and splitting the mono audio signal into at least two frequency bands. Alternatively, said determining the respective mono audio signals may involve splitting each audio signal into at least two frequency bands and, in each frequency band, downmixing the respective audio signals to a respective mono audio signal. The splitting may be effected by a combination of a high-pass filter, a low-pass filter, and optionally, one or more bandpass filters.

In some embodiments, the first processing mode may involve applying a first correction filter to that part of the mono audio signal in the first one of the at least two frequency bands that is routed to the one of the first and second speakers. The first processing mode may further involve applying a second correction filter to that part of the mono audio signal in the second one of the at least two frequency bands that is routed to the other one of the first and second speakers. The first correction filter may be different from the second correction filter. The first correction filter may be specific to the one of the first and second speakers (e.g., main speaker). The second correction filter may be specific to the other one of the first and second speakers (e.g., ear speaker). The first correction filter may also be applied to that part of the mono audio signal in the second one of the at least two frequency bands that is routed to the one of the first and second speakers (e.g., to any (small) high frequency component that is nevertheless routed to the main speaker). Likewise, the second correction filter may also be applied to that part of the mono audio signal in the first one of the at least two frequency bands that is routed to the other one of the first and second speakers (e.g., to any (small) low frequency component that is nevertheless routed to the ear speaker). Thereby, optimum use of the two speakers can be achieved, together with a faithful rendering of the audio content, possibly in accordance with artistic intent.

In some embodiments, the first processing mode may involve applying a multi-band dynamic range compressor, peak limiter, RMS limiter, or signal limiter to the audio signals after filtering by the first and second correction filters. This may be done to keep the audio signals in the linear range(s) of the first and second speakers.

In some embodiments, in the first processing mode, the first one of the at least two frequency bands may be a low frequency band and the mono audio signal in the low frequency band may be routed only to the one of the first and second speakers (e.g., to the main speaker).

In some embodiments, the one of the first and second speakers may be a main speaker of the mobile device. In some embodiments, the other one of the first and second speakers may be an ear speaker of the mobile device. The mobile device may be a mobile phone with a main speaker and an ear speaker, for example. Routing the low frequency portion of the audio data to the main speaker, which typically has better handling capabilities than the ear speaker for low frequency content, is advantageous in terms of efficiency, loudness and timbre as the most capable speaker will be able to reproduce low frequencies more accurately. It is also known from spatial psychoacoustics that the human hearing system is not particularly sensitive to spatial attributes such as location and/or spatial width at low frequencies.

In some embodiments, in the first processing mode, the second one of the at least two frequency bands may be a high frequency band, and the mono audio signal in the high frequency band may be routed only to the other one of the first and second speakers (e.g., to the ear speaker).

In some embodiments, the method may further include, for at least one of the first and second speakers, applying a speaker correction filter to the respective audio signal that is routed to that speaker. The speaker correction filter may have a phase component intended to match the phase response of that speaker to the phase response of the other one of the first and second speakers. This encompasses both the case that a speaker correction filter is applied for one speaker only, and the phase response of that speaker is matched to the phase response of the other speaker, and the case that a respective speaker correction filter is applied to each speaker in such manner that the net phase responses of the speakers after applying respective speaker correction filters are (substantially) matched.

In some embodiments, the method may further include obtaining sensor data from one or more sensors of the mobile device. The method may yet further include determining the device orientation based on the sensor data.

In some embodiments, the method may further include obtaining a user input. The method may yet further include determining the device orientation based on the user input.

In some embodiments, the mobile device may be a mobile phone, the first speaker may be a main speaker of the mobile phone, and the second speaker may be an ear speaker of the mobile phone. The main speaker and the ear speaker may be different from each other in, e.g., their frequency magnitude responses and/or their phase responses.

Another aspect of the disclosure relates to a mobile device. The mobile device may include a first speaker and a second speaker. The mobile device may further include a processor coupled to a memory storing instructions for the processor. The processor may be adapted to perform the method according to the above aspect and any of its embodiments.

Another aspect of the disclosure relates to a computer program including instructions for causing a processor that carries out the instructions to perform the method according to the above aspect and any of its embodiments.

Another aspect of the disclosure relates to a computer-readable storage medium storing the computer program according to the foregoing aspect.

It is understood that the present disclosure is not limited to mobile devices that have exactly two speakers. Rather, the present disclosure is applicable to mobile devices with any number of speakers in excess of two. For example, a mobile device may include more than one main speaker and/or more than one auxiliary/ear speaker.

BRIEF DESCRIPTION OF THE DRAWINGS

Example embodiments of the disclosure are explained below with reference to the accompanying drawings, wherein like reference numbers indicate like or similar elements, and wherein FIG. 1 schematically illustrates an example of a mobile device according to embodiments of the disclosure, FIG. 2 schematically illustrates a block diagram of an example of a first processing mode according to embodiments of the disclosure, FIG. 3 schematically illustrates a block diagram of an example of a second processing mode according to embodiments of the disclosure, FIG. 12 is a flowchart illustrating an example of a method of processing audio data according to embodiments of the disclosure.

DETAILED DESCRIPTION

As indicated above, identical or like reference numbers in the disclosure indicate identical or like elements, and repeated description thereof may be omitted for reasons of conciseness.

Broadly speaking, the present disclosure relates to customized device audio processing (virtualization, speaker correction) of a device that has at least two or more speakers, where the audio processing:
 1) employs a different audio processing algorithm topology depending on the device's use case, and/or
 2) employs magnitude compensation for at least one of the speakers depending on the device's use case, and/or
 3) includes a phase compensation for at least one of the speakers, and/or
 4) is dependent on the device's orientation, location, or environment including any changes therein over time.

Figure 1:
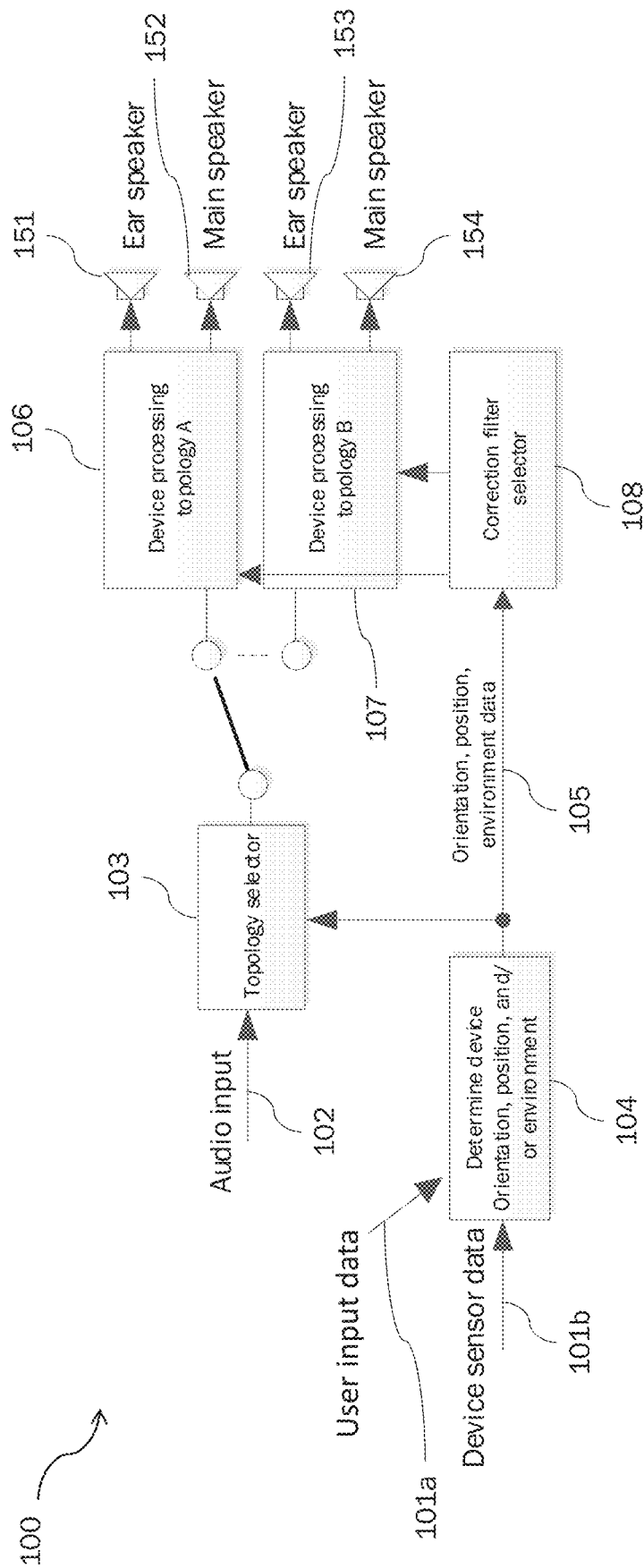

FIG. 1 illustrates an example of a device 100 in accordance with embodiments of the disclosure. The device 100 may be a mobile device, for example, such as a mobile phone, smartphone, tablet device, mobile media player, or the like.

An outline of a method 1200 according to embodiments of the disclosure will now be described with reference to FIG. 12. Method 1200 is a method of processing audio data for replay on a mobile device (e.g., the device 100 of FIG. 1) with a first speaker and a second speaker. It is understood that the audio data includes a respective audio signal (e.g., audio channel) for each of the first and second speakers. Typically, the first and second speakers are different from each other, for example with respect to their frequency magnitude responses. For example, the first speaker may be a main speaker of the mobile device, and the second speaker may be an auxiliary speaker of the mobile device. In particular, the first speaker may be a main speaker of a mobile phone, and the second speaker may be an ear speaker of the mobile phone.

At step S1210, a device orientation of the mobile device is determined. For example, the mobile device (e.g., device 100) may obtain (e.g., receive) device sensor data 101*b* and/or user data 101*a*. The sensor data may be received from one or more sensors of the device 100. The device sensor data 101*b* and/or user data 101*a* may be processed and/or analyzed to determine orientation, position and/or environment use case data 105. In particular, the device orientation may be determined based on sensor data. The data 105 which may be provided to (1) a topology selector 103 and (2) a correction filter selector 108.

The orientation, location and/or environment data 105 of the device may be detected automatically based on the device's accelerometer data, gyroscope, compass, GPS sensor, light sensor, microphone, or any other sensor data available to the device.

Accordingly, the one or more sensors of the device 100 may include any, some, or all of an accelerometer, a gyroscope, a compass, a GPS sensor, a light sensor, and/or microphone.

The orientation, location and/or environment data 105 of the device 100 may also be determined at block 104 from direct user input, such as, for example, voice prompts, keyboard input or any other method through which direct user input is collected. In particular, the device orientation may be determined based on user input. The user of the device may provide such input to direct or modify the device processing, signal a specific use case, or request a specific mode of device processing.

The orientation, location, environment or use-case data may be used by the topology selector 103 to selectively switch between two or more available device processing algorithm topologies (e.g., device processing topology A 106 or device processing topology B 107, or first and second processing modes). The data may further be used by a correction filter selector to modify or select correction filter data in one or more device processing topologies.

In some embodiments, the method 1200 decides on using either a first processing mode or a second processing mode for applying to the audio signals for the first and second speakers, depending on the determined device orientation. The most relevant device orientations are horizontal orientation and vertical orientation. Horizontal orientations may also be referred to as landscape orientation or landscape mode. Vertical orientation may also be referred to as portrait orientation or portrait mode. Accordingly, the method may further include mapping a device orientation to either horizontal orientation or vertical orientation, depending on one or more angles defining the device orientation. For example, if the device orientation is closer to horizontal orientation than to vertical orientation, the device orientation may be treated as horizontal orientation. Otherwise, the device orientation may be treated as vertical orientation. For example, horizontal orientation may be defined as that orientation in which the two speakers of the mobile device are approximately located at a same height. On the other hand, vertical orientation may be defined as that orientation in which the first and second speakers are located at substantially different heights.

At step S1220 of method 1200, if the determined device orientation is vertical orientation, a first processing mode is applied to the audio signals for the first and second speakers.

On the other hand, if the determined device orientation is horizontal orientation, a second processing mode is applied to the audio signals for the first and second speakers at step S1230.

The method 1200 may further comprise receiving the audio data, for example from a bitstream.

In general, applying the first processing mode involves determining respective mono audio signals in at least two frequency bands based on the audio signals for the first and second speakers. In a first one of the at least two frequency bands, a larger portion of the respective mono audio signal is routed (e.g., sent) to one of the first and second speakers. In a second one of the at least two frequency bands, a larger portion of the respective mono audio signal is routed to the other one of the first and second speakers. Applying the second processing mode involves applying cross-talk cancellation to the audio signals for the first and second speakers. Examples of the first and second processing modes are described below.

Figure 2:
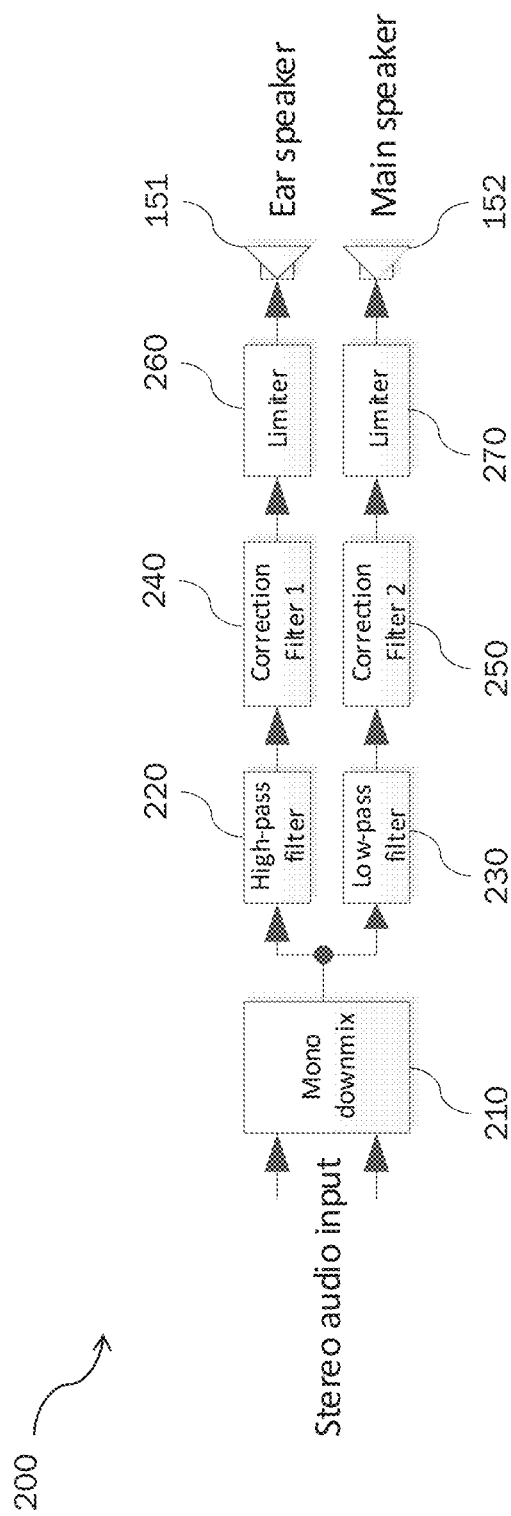

FIG. 2 illustrates a more in depth example 200 of the device processing topology A of a device in a portrait mode (vertical orientation). This topology A is based on optimization or maximization of loudness and improved timbre by means of correcting for a non-flat frequency response of the two speakers, in combination with the observation that one speaker is more effective or efficient at reproducing audio in at least one frequency range. Processing topology A is a non-limiting example of the first processing mode used in method 1200.

This mode (or the first processing mode in general) is engaged automatically whenever the device is placed or held vertically, (e.g. in 'Portrait mode'). For example, the ear speaker may be above the main speaker. In such a case, there is no basis for spatial imaging as both speakers are positioned vertically relative to one another. Such orientation can be determined based on an analysis of accelerometer data showing a gravity component that is substantially downwards oriented, for example.

A typical asymmetric speaker layout comprising an ear speaker and main speaker will exhibit different frequency responses across the two drivers. In particular, the main speaker is typically more efficient and capable in reproducing low-frequency content, while the opposite can be true for high-frequency content. In order to produce a maximum loudness while minimizing the amount of electric and/or digital power required, it is beneficial to split the signal(s) to be reproduced by the two drivers in at least two (or more) frequency bands. A low-frequency band is reproduced by the main speaker, while the high-frequency band is reproduced by the ear speaker. Hybrid approaches may be feasible as well involving multiple frequency bands that are steered to just one or both speakers. Besides the application of such band-split filters, speaker correction can be applied simultaneously by superimposing a correction filter on the band-split filter(s).

An overview 200 of this particular speaker correction mode is shown in FIG. 2. As shown in FIG. 2, a stereo audio input signal is first downmixed to mono. This may be done by a mono downmix module 210. Subsequently, a band-split filter (consisting of a high-pass filter 220 and a low-pass filter 230 in parallel) splits the signal into two frequency ranges. These signals are processed by an optional correction filter(s) (e.g., correction filter 1, 240, and correction filter 2, 250) and limiter(s) 260, 270 (e.g., peak limiters) prior to outputting the signal (e.g., outputting the signal to the ear speaker 151 and main speaker 152, respectively). The optional correction filters can be minimum phase, linear phase, zero phase, or having a prescribed phase response. In typical cases employing asymmetric speaker layouts, the two correction filters will be different from another. In this embodiment of the speaker correction topology, there will preferably be no cross-talk cancellation or speaker virtualization in the processing chain. This may hold true for all examples of the first processing mode. In other words, the first processing mode deliberately does not apply cross-talk cancellation or speaker virtualization to the audio signals for the first and second speakers.

In general, in the first processing mode respective mono audio signals are determined in at least two frequency bands based on the audio signals for the first and second speakers (e.g., based on a stereo signal). In a first one of the at least two frequency bands, a larger portion of the respective mono audio signal (possibly all of the respective mono audio signal) is routed to one of the first and second speakers. The first one of the at least two frequency bands may be a low frequency band. The one of the first and second speakers may be the main speaker of the mobile device (e.g., for a mobile phone with a main speaker and an ear speaker). In a second one of the at least two frequency bands, a larger portion of the respective mono audio signal (possibly all of the respective mono audio signal) is routed to the other one of the first and second speakers. The second one of the at least two frequency bands may be a high frequency band. The other one of the first and second speakers may be an ear speaker of the mobile device (e.g., for a mobile phone with a main speaker and an ear speaker). For example, the mono audio signal in the low frequency band may be routed only to the one of the first and second speakers (e.g., the main speaker) and the mono audio signal in the high frequency band may be routed only to the other one of the first and second speakers (e.g., the ear speaker).

The mono audio signals in the at least two frequency bands can be obtained in different manners. For example, the audio signals for the first and second speakers (e.g., the stereo audio signal) can be first downmixed to a mono audio signal, which is then split into the at least two frequency bands. Alternatively, each audio signal can be first split into the at least two frequency bands, and the split audio signals in each frequency band can then be downmixed to a mono audio signal for that frequency band. In both cases, the splitting may be effected by a combination of a high-pass filter and a low-pass filter (e.g., in parallel), and optionally, one or more bandpass filters.

In some embodiments, speaker-specific correction filters may be applied to respective parts of the mono audio signals in the at least two frequency bands. Herein, speaker-specific means that the correction filters are different for the first and second speakers. For example, a first correction filter can be applied to that part of the mono audio signal in the first one of the at least two frequency bands that is routed to the one of the first and second speakers. For example, the first correction filter can be applied to (that part of) the mono audio signal in the low frequency band that is applied to the main speaker. Likewise, a second correction filter can be applied to that part of the mono audio signal in the second one of the at least two frequency bands that is routed to the other one of the first and second speakers. For example, the second correction filter can be applied to (that part of) the mono audio signal in the high frequency band that is applied to the ear speaker.

The first correction filter may be specific to the one of the first and second speakers (e.g., the main speaker). Likewise, the second correction filter may be specific to the other one of the first and second speakers (e.g., the ear speaker). Accordingly, if not all of the mono signal in the first (e.g., low) frequency band is routed to the one of the first and second speakers (e.g., the main speaker), the second correction filter may also be applied to that (presumably small) part of the mono audio signal in the first (e.g., low) frequency band that is routed to the other one of the first and second speakers (e.g., the ear speaker). Likewise, if not all of the mono signal in the second (e.g., high) frequency band is routed to the other one of the first and second speakers (e.g., the ear speaker), the first correction filter may also be applied to that (presumably small) part of the mono audio signal in the second (e.g., high) frequency band that is routed to the one of the first and second speakers (e.g., the main speaker).

After filtering the audio signals by the aforementioned correction filters, the first processing mode can further involve applying one of a multi-band DRC, a peak limiter, a RMS limiter, or a signal limiter to the audio signals that are eventually routed to the first and second speakers. These compressors/limiters can be examples of limiters 260, 270 in FIG. 2. The multi-band DRC, the peak limiter, the RMS limiter, or the signal limiter can be specific to the respective speaker. Thereby, it can be ensured that the audio signals are kept in the linear range of their respective speaker. In the first processing mode it may be preferable to decouple the gains of the multiband DRC, peak limiter, RMS limiter, or signal limiter across the channels of the first and second speakers, at least over some volume range, to increase loudness.

Figure 11:
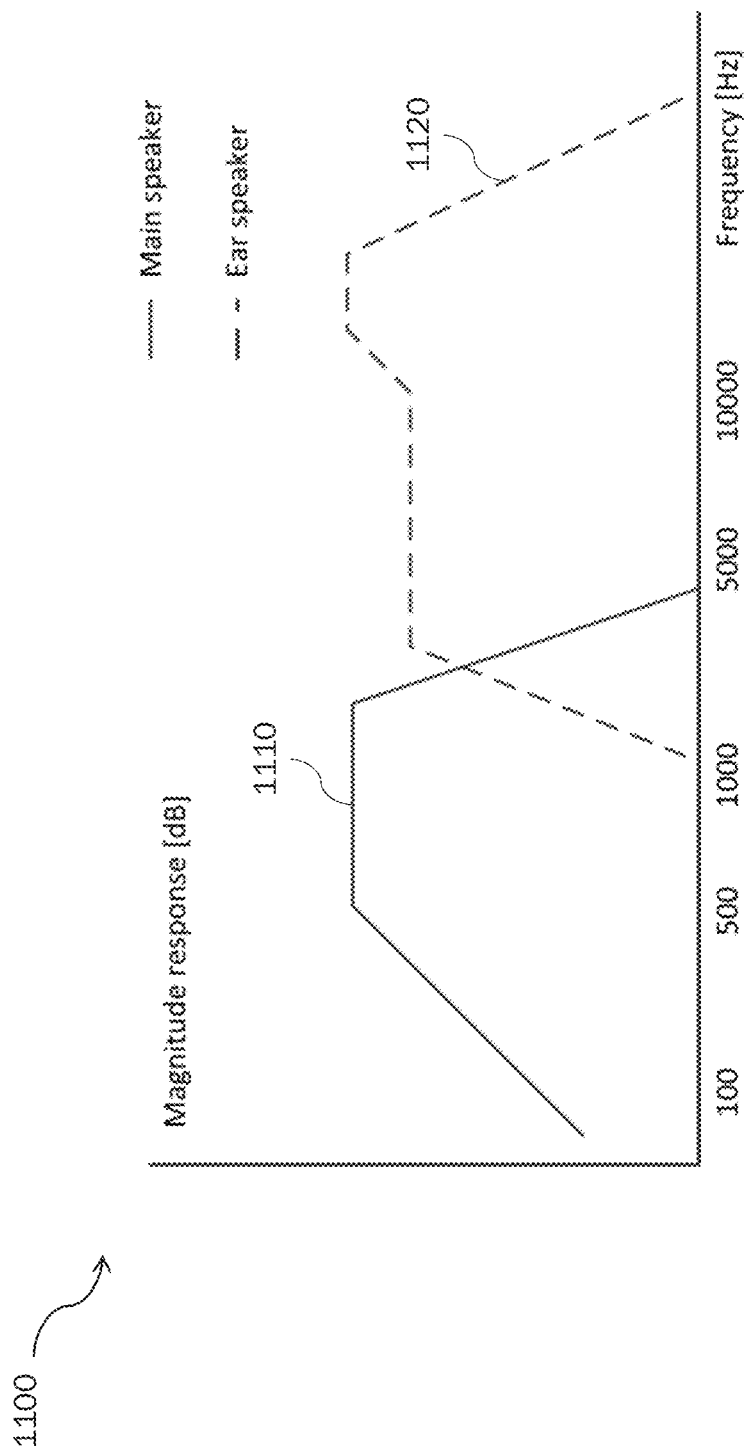
FIG. 11 illustrates an example of a combination of a high-pass/low-pass filter and subsequent correction filters.

An example a combination of a high-pass/low-pass filters (to achieve band-splitting) and subsequent two correction filters are shown in FIG. 11, in which curve 1110 is the magnitude response of the filter for the main speaker and curve 1120 is the magnitude response of the filter for the ear speaker. In this example, the main speaker correction filter is band-limited up to a certain frequency, for example 2 kHz. The ear speaker, on the other hand, produces most of frequency content above 2 kHz. Furthermore, both speakers may have a correction filter that amplifies or attenuates specific frequency ranges such as the exemplary filter visualized for the ear speaker.

Figure 3:
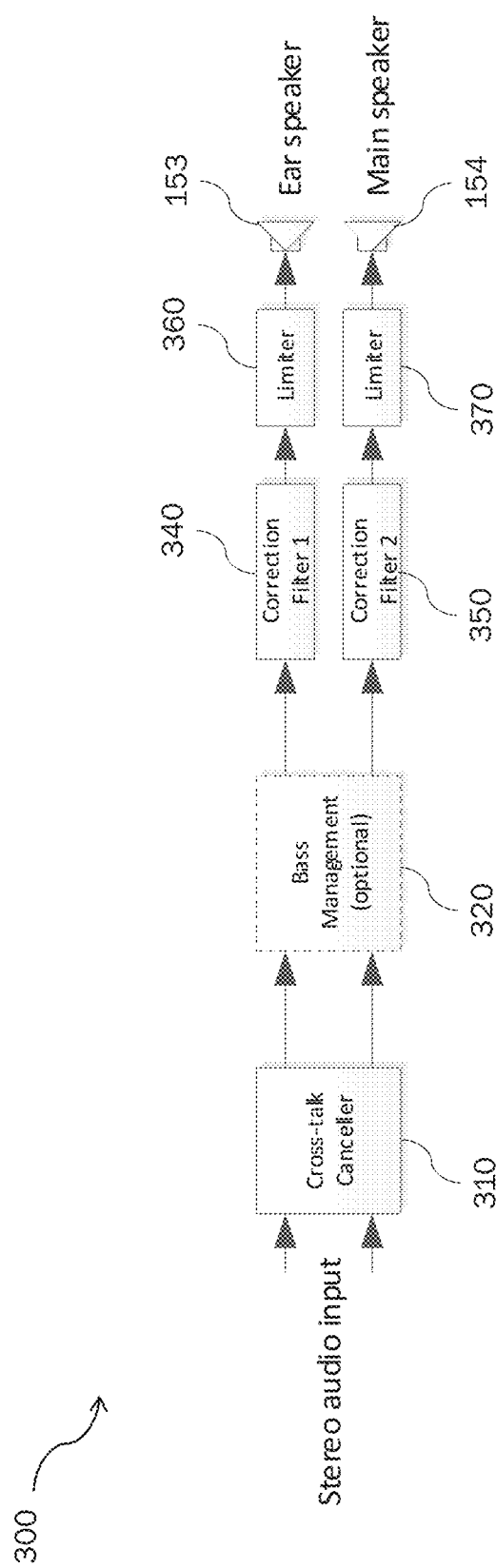

FIG. 3 illustrates a more in depth example 300 of the device processing topology B in a landscape mode (horizontal orientation). This topology might include asymmetric speaker correction. The "landscape" mode device processing of FIG. 3 includes cross-talk canceller and optional bass management modules. In this embodiment, the device is assumed to be held horizontally, e.g. in "landscape" mode. In this mode, the device processing aims at reproducing a faithful spatial image of stereo or multi-channel content. Processing topology B is a non-limiting example of the second processing mode in method 1200. It is understood that the second processing mode, by contrast to the first processing mode, applies cross-talk cancellation (e.g., as part of speaker virtualization) to the audio signals for the first and second speakers.

Thus, as is shown in the example of FIG. 3, a stereo input signal is processed by a cross-talk cancellation stage 310 which is absent in the 'portrait mode' shown in FIG. 2. An overview of cross-talk cancellation, and cross-talk cancellation for Dolby AC-4 specifically is discussed in WIPO Publication No. WO 2018/132417, titled "DYNAMIC EQUALIZATION FOR CROSS-TALK CANCELLATION," assigned to Dolby Laboratories Licensing Corp., by Jeroen Breebaart and Alan Seefeldt, the contents of which are herein incorporated by reference.

For asymmetric speaker configurations, in which one of the first and second speakers has inferior power handling capabilities and/or inferior capabilities to play back low frequency content compared to the other one of the first and second speakers, it may be advantageous to bypass cross-talk cancellation for low frequencies. Thereby, overall loudness can be improved. Bypassing cross-talk cancellation for low frequencies may proceed as follows. A mono audio signal is determined in a low frequency band based on the audio signals for the first and second speakers (e.g., based on a stereo signal). Determining this mono audio signal may involve low pass filtering the audio signals for the first and second speakers and subsequently downmixing the low pass filtered audio signals to obtain the mono audio signal. The order of low-pass filtering and downmixing may be reversed in some embodiments. The determined mono audio signal in the low frequency band is then routed to (only) a main speaker among the first and second speakers. On the other hand, cross-talk cancellation is applied to the high pass filtered versions of the audio signals for the first and second speakers. An output of the cross-talk cancellation for the high frequency band is then routed to the first and second speakers.

Figure 7A:
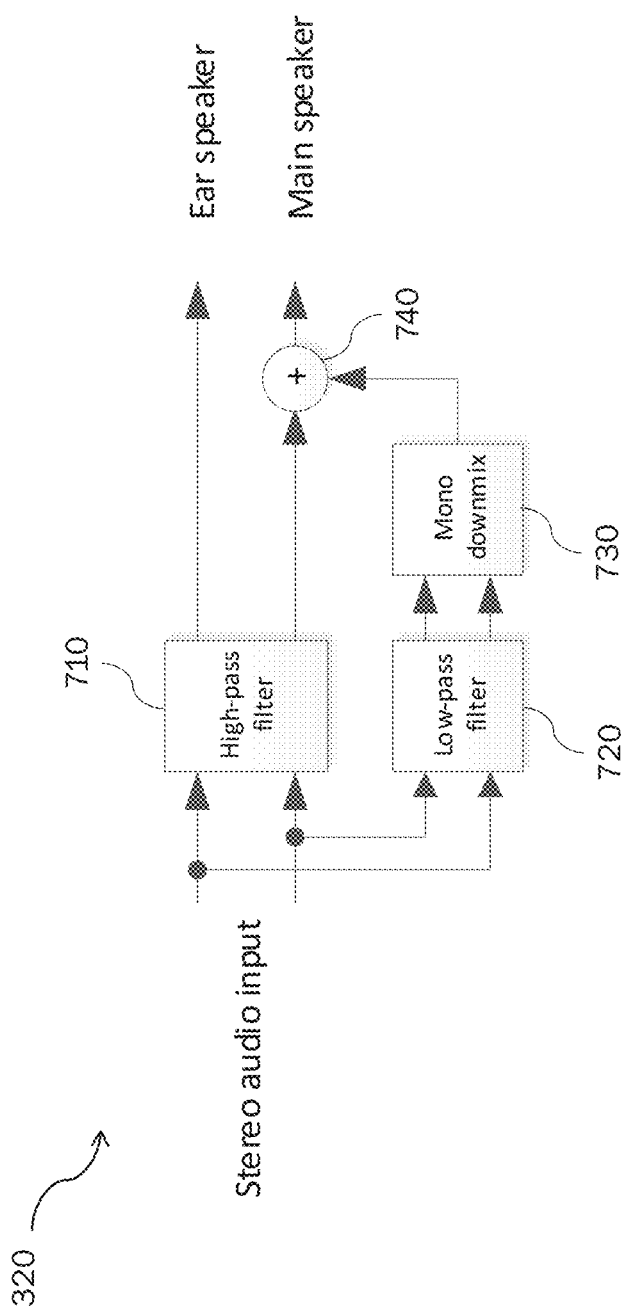
FIG. 7A illustrates a block diagram of an example of the optional bass management stage for the second processing mode.

Bypassing cross-talk cancellation for low frequencies can be advantageously performed in conjunction with the processing that may be performed by the bass management module(s), as schematically illustrated in FIG. 7A.

Moreover, in some embodiments cross-talk cancellation can also be bypassed for a center channel that is extracted from the audio signals for the first and second speakers (e.g., from a stereo signal). Again, this may contribute to improving overall loudness. Subsequent to cross-talk cancellation in FIG. 3, the signal is optionally processed by a bass management stage 320, as shown in FIG. 7A.

Optionally, the second processing mode can further involve applying respective correction filters to the audio signals after cross-talk cancellation (and optionally, bass management) that are routed to the first and second speakers, respectively. That is, a first correction filter may be applied to that audio signal, after cross-talk cancellation (and optionally, bass management), that is eventually routed to the one of the first and second speakers, whereas a second correction filter may be applied to that audio signal, after cross-talk cancellation (and optionally, bass management), that is eventually routed to the other one of the first and second speakers. The first and second correction filters may be specific to their respective speakers and may be different from each other in general.

That is, in the example of FIG. 3, The two signals are optionally processed by speaker correction filter 1, 340, and speaker correction filter 2, 350 for the ear speaker 153 and the main speaker 154, respectively. These filters will typically not be identical, and moreover may include a phase response reflecting the difference in the phase response of the two speakers to ensure that the output of the ear and main speakers is phase matched.

That is, the second processing mode can involve applying, for at least one of the first and second speakers, a speaker correction filter to the respective audio signal that is eventually routed to that speaker. Therein, the speaker correction filter preferably has a phase component that is chosen/set to (substantially) match the phase response of that speaker to the phase response of the other one of the first and second speakers. In some cases, speaker correction filters can be applied to both audio signals (i.e., the audio signal that is eventually routed to the first speaker and the audio signal that is eventually routed to the second speaker). In this case, the phase components of both speaker correction filters are chosen/set so that the phase responses of the two speakers (substantially) match. In other words, to allow for a faithful, well-balanced stereo image emitted from the ear and main speakers, the two correction filters (1) and (2) are configured such that the resulting response of loudspeaker plus correction filter is sufficiently similar. In other words, the speaker correction filters aim not only at improving overall timbre, but also at matching the two effective responses in magnitude and phase.

In the second processing mode, the correction filters are coupled to the drivers/transducers of their respective speakers, i.e., the correction filters can be specific to their respective speakers. In this configuration, it is understood that, dependent on the specific horizontal orientation of the device (e.g., "normal" landscape mode or "upside-down" landscape mode, which can be obtained by a rotation of the device by 180 degrees) the audio channels need to be interchanged to ensure that the left channel is perceived as coming from the left and the right channel is perceived as coming from the right. In other words, the audio channels may have to be flipped in the 180 degree rotation case of landscape mode.

Regardless of the flipping of the audio channels, the correction filters are not flipped and remain coupled to their respective speakers.

Figure 4:
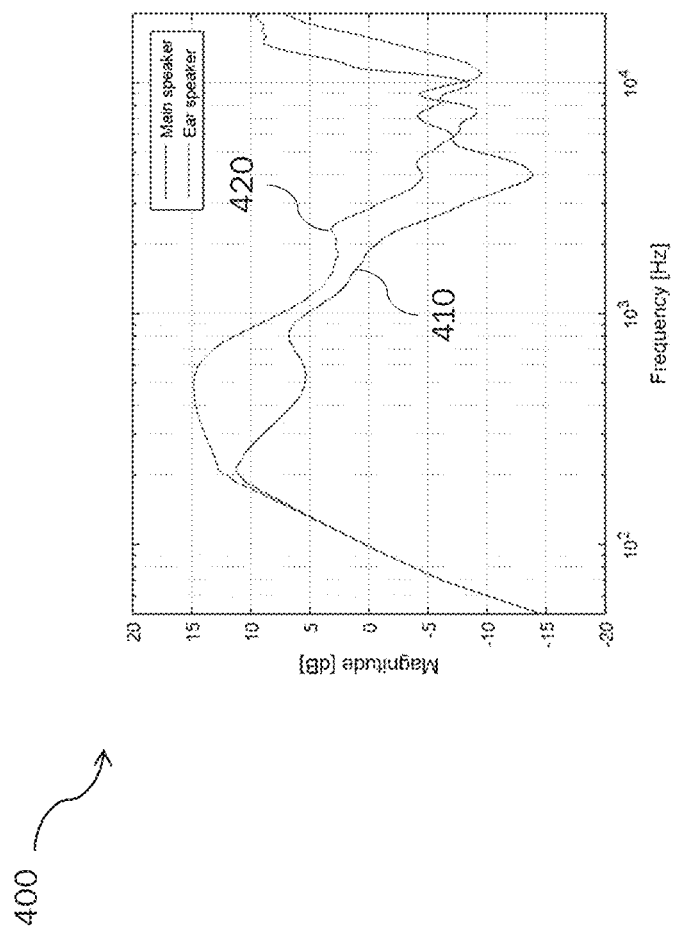
FIG. 4 illustrates an example of speaker correction filters for an ear speaker and a main speaker of a mobile phone.

It is understood that also the first processing mode according to embodiments of this disclosure can involve applying speaker correction filter(s). FIG. 4 illustrates an example of such (speaker) correction filters for an ear speaker and a main speaker. Curve 410 depicts the magnitude response of the main speaker correction filter and curve 420 depicts the magnitude response of the ear speaker correction filter.

Figure 5:
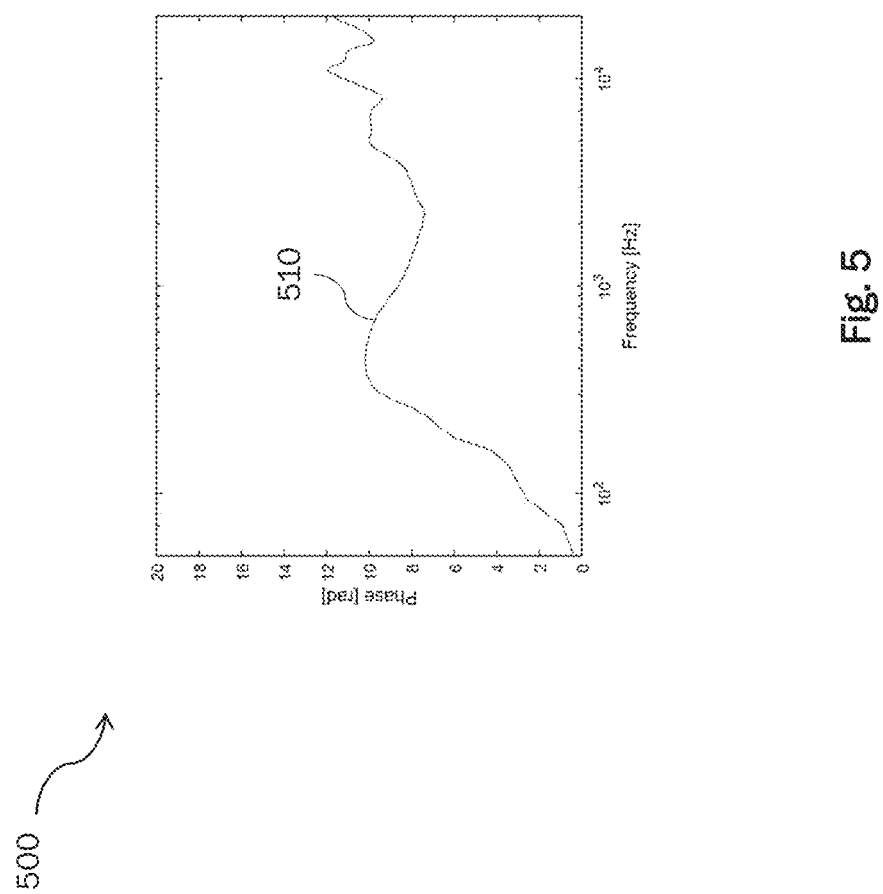
FIG. 5 illustrates an example of a phase offset to be applied to the main speaker to align its effective phase response to the ear speaker.

To allow for accurate phase matching of the two speakers, the two correction filters may differ in their phase response to correct any phase offsets. An exemplary phase offset to be applied to the main speaker to align its effective phase response to the ear speaker is shown as curve 510 in FIG. 5. The difference in the phase response may be distributed across the two compensation filters in a variety of ways, in order to align the phase response between two speakers.

Applying the difference to the main speaker only is an option. Another option would be to apply the inverse of this phase difference to the ear speaker to align the ear speaker to the main speaker.

Figure 6:
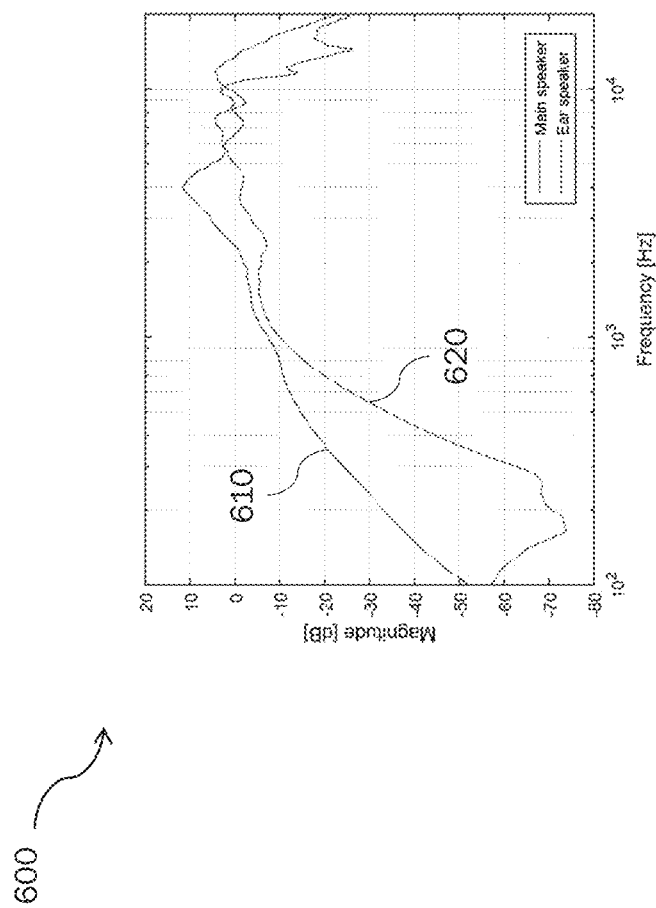
FIG. 6 illustrates an example of a frequency response graph for the main speaker and the ear speaker.

FIG. 6 illustrates an exemplary frequency response graph for the main and ear speakers. Curve 610 represents the frequency response of the main speaker and curve 620 represents the frequency response of the ear speaker. As can be seen from FIG. 6, the main speaker is significantly better equipped to reproduce low-frequency signals (e.g., below 1 kHz) than the ear speaker.

After applying cross-talk cancellation to the audio signals for the first and second speakers (and optionally, after applying respective correction filters), the second processing mode can further involve applying one of a multi-band DRC, a peak limiter, a RMS limiter, or a signal limiter to the respective audio signals that are eventually routed to the first and second speakers. The multi-band DRC, the peak limiter, the RMS limiter, or the signal limiter can be specific to the respective speaker. Thereby, it can be ensured that the audio signals are kept in the linear range of their respective speaker. In the example of FIG. 3, this can be done in respective limiters 360, 370. In this second processing mode it can be advantageous to couple the multiband DRC/limiter gains between first and second speaker signals (i.e., audio signals that are routed to the first and second speakers, respectively), to ensure accurate spatial imaging. This may be done at least over some frequency range, for example between 300 Hz and 3 KHz).

FIG. 7A illustrates a block diagram of the optional bass management stage 320 for "landscape mode" (as an example of the second processing mode). The bass management stage 320 typically comprises one or more high-pass or low-pass filters 710, 720 in combination with a summation module 740 and/or downmix module 730. One exemplary embodiment of such a bass management stage 320 is shown in FIG. 7A.

Figure 7B:
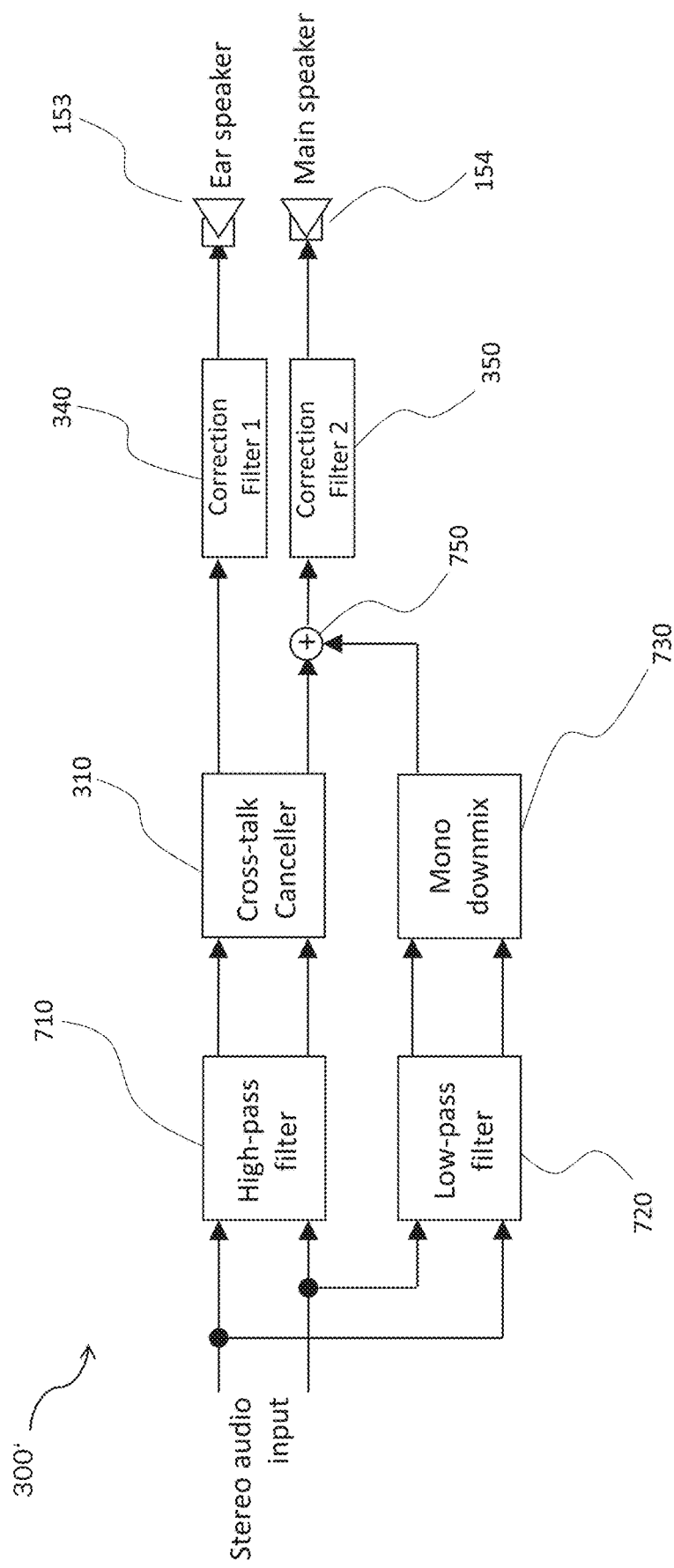
FIG. 7B illustrates a block diagram of another example of the second processing mode according to embodiments of the disclosure.

It is understood that cross-talk cancellation and bass management can be combined also in different manner. For example, cross-talk cancellation and bass management can be performed in an "intertwined" manner FIG. 7B shows an example 300' of an alternative device processing topology B in landscape mode (horizontal orientation). This time, the stereo audio input (the audio signals for the first and second speakers) is high-pass filtered in a high-pass filter 710 and is low-pass filtered in a low-pass filter 720. The output of the low-pass filter 720 is subjected to a mono downmix in a downmix module 730 (e.g., a summation module/adder that adds the low-pass filtered audio signals). The output of the high-pass filter 710 is subjected to cross-talk cancellation in cross-talk canceller 310. That audio signal, after cross-talk cancellation, that is intended for the ear speaker 153 is routed to the ear speaker 153, optionally after application of a correction filter 340 and/or a limiter (not shown). The output of the downmix module 730 is added to that audio signal, after cross-talk cancellation, that is intended for the main speaker 154 by a summation module 750. The resulting audio signal is then routed to the main speaker 154, optionally after application of a correction filter 350 and/or a limiter (not shown). This processing is an example of bypassing cross-talk cancellation for low frequencies. It is understood that the correction filters and/or limiters can be the same as described above in the context of FIG. 3.

As discussed in the context of the processing topology A for "portrait mode" (as an example of the first processing mode) with respect to FIG. 2, the main speaker is typically more efficient and capable in reproducing low-frequency content than the ear speaker. In order to improve playback of low frequency content in the channel of the stereo signal send to the ear speaker, it is advantageous to re-route this content and send it to the main speaker instead. This can be accomplished by a band-split filter comprising a high-pass and a low-pass filter. In the high frequency band, the two channels of the stereo signal are sent to the ear and main speakers, respectively, providing stereo playback. In the low frequency range (i.e., bass range), a mono downmix is created and added to the signal that is sent to the main speaker, since the ear speaker would be less capable of playing back this content. The order of low-pass filter and down-mix stage can be interchanged as both stages are typically linear processes. If the mono downmix is generated by simply adding the two signals without subsequent gain/attenuation, a single band-split filter applied to the ear speaker signal is sufficient, only passing the high frequency band from the ear speaker signal to the ear speaker, and adding the low frequency band from the ear speaker signal to the main speaker signal, without processing the main speaker signal otherwise. For example, in a landscape bass management mode, the main speaker may be left alone and only a band-split may be applied to ear speaker signal. Reproducing low-frequencies by the most capable speaker is advantageous in terms of efficiency, loudness and timbre as the most capable speaker will be able to reproduce low frequencies more accurately. It is also known from spatial psychoacoustics that the human hearing system is not particularly sensitive to spatial attributes such as location and/or spatial width at low frequencies. In other words, the reproduction of low frequencies by predominantly one of the two drivers will have very little perceptual impact on spatial attributes.

In one example, the present invention is directed to asymmetric cross-talk cancellation. On handheld devices (e.g., mobile phones and tablets) the speakers are close together even in landscape mode. When the device is positioned in an landscape orientation, the addition of cross-talk cancellation (often with coupled virtualization) can greatly improve the perceived width and immersiveness of the output sound. See, e.g., WIPO Publication No. WO 2018/132417. The crosstalk canceller can be composed of two filters—one on each channel (ipsilateral paths)—and another two filters for the two interchannel (contra-lateral) paths. In the case of speakers with large difference in power handling capabilities, effective crosstalk cancellation is limited by the power handling of the weakest speaker. This can result in very poor loudness levels particularly at low frequencies, where much of the available speaker power is being cancelled by one-another. For this situation band splitting filters where low frequencies bypass the canceller and are sent to the more capable speaker can give big gains in loudness.

Centre extraction techniques that bypass the canceller for the center channel have been developed to improve dialog clarity. Such systems are of even greater value in this asymmetric speaker situation to give improved loudness as they don't lose energy to the crosstalk cancellation for center panned content. Additionally in this topology it is clear that the asymmetric correction filters can be incorporated into the crosstalk canceller for computational efficiency.

There are some hardware topologies where the robustness of the soundstage can be improved by not only asymmetric phase cancellation of the ipsilateral paths but also asymmetric phase cancellation of the contra-lateral paths, due to the asymmetric properties of the directivity pattern of the speakers.

Figure 8:
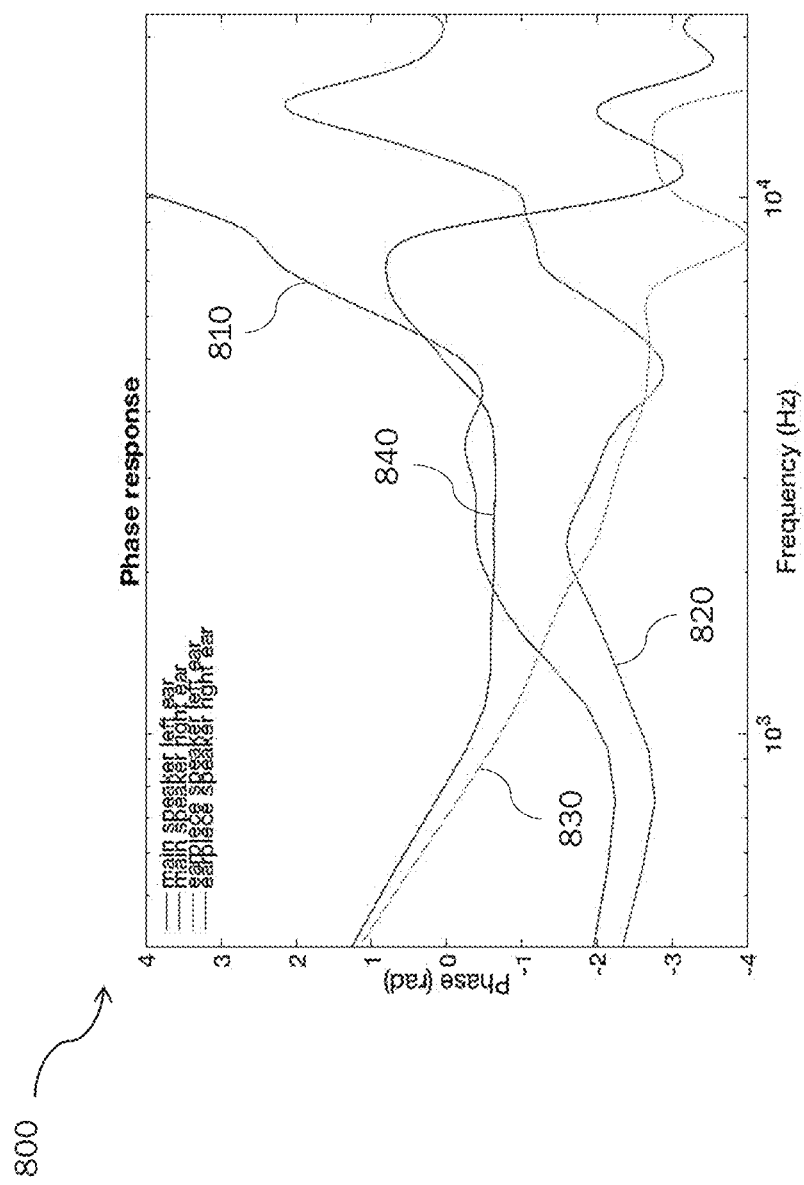
FIG. 8 illustrates an example of a typical phase response for the main speaker and the ear speaker.

FIG. 8 illustrates a typical phase response for main speakers (curve 810: left ear, curve 820: right ear) and earpiece speakers (curve 830: left ear, curve 840: right ear). In one example, the correction may be based on sensor data for orientation and/or position.

In one example, the main speakers of a device may be mounted at the bottom of the device in a direction perpendicular to the top-down direction. The main speakers will have a frequency response that depends significantly on the environment of the device and its orientation. For example, if a device is on a flat, hard surface such as a table or desk, the frequency response of a loudspeaker is significantly enhanced compared to the response of the same loudspeaker when the device is hand held. To ensure appropriate spatial imaging using the ear and main speaker, and a consistent timbre between the two speakers, the speaker correction filters need to be modified appropriately depending on the device's orientation, position and environment use case.

Figure 9:
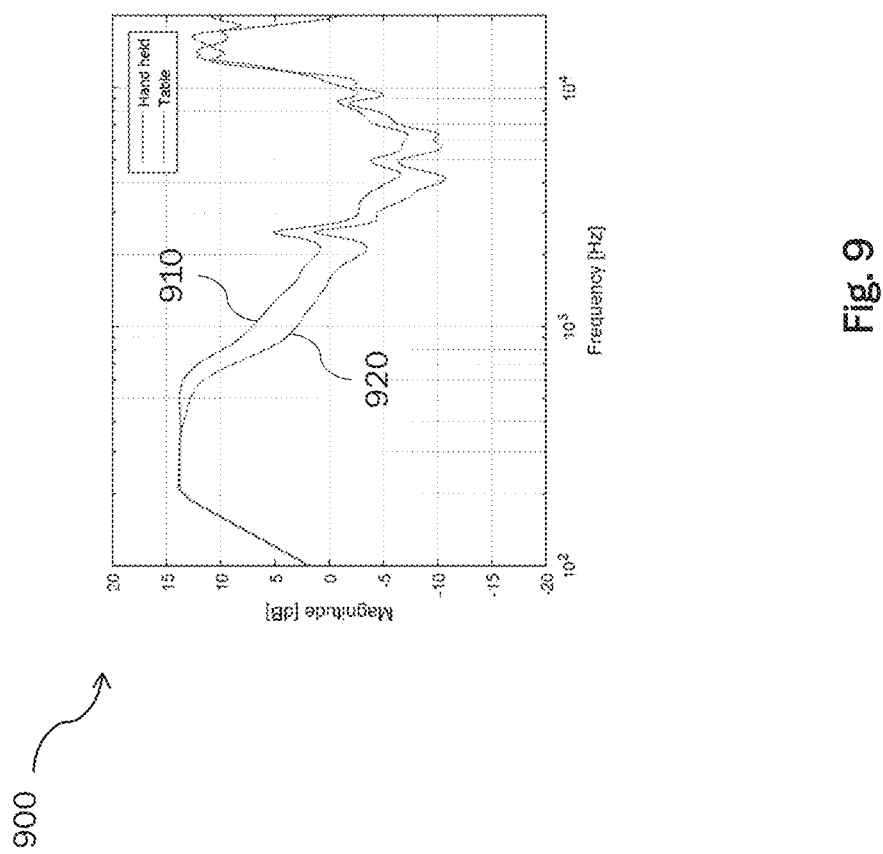
FIG. 9 illustrates an example of a main speaker correction filter for two different use cases.

An example of a main-speaker correction filter for two different use cases is shown in FIG. 9. The correction filter for the main speaker has a higher gain across a wide range of frequencies when the device is hand held (curve 910) compared to being put on a flat hard surface such as a table (curve 920).

The detection of the environment and its implications for (changing the) correction filters could come from a wide variety of sensors that are typically available on mobile devices, including but not limited to:
- Camera (front or rear);
- Microphones;
- Accelerometer or gyroscope;
- Any other device sensor.

To determine the effect of the environment on acoustical performance (including aspects such as timbre and spatial imaging on asymmetric speaker configurations), one or more microphones may be used that are available on a portable/mobile device. The goal of this method is to use one or more microphones to capture the audio that is reproduced by the device itself, analyzing the audio to determine environment properties and current acoustic performance, and adjusting the audio playback and/or device processing appropriately if necessary to optimize timbre, loudness, and/or spatial imaging.

Figure 10:
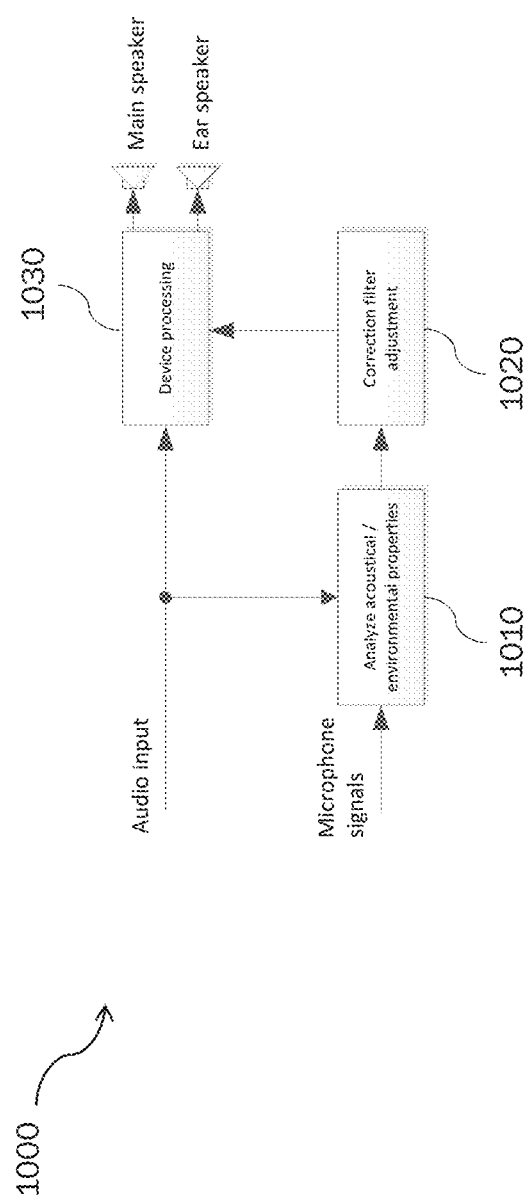
FIG. 10 illustrates a high-level overview of a device processing method using one or more microphones to determine acoustical and/or environmental properties resulting in an adjustment of a device-processing correction filter.

FIG. 10 illustrates a high-level overview of a device processing method 1000 using one or more microphones to determine acoustical and/or environmental properties resulting in an adjustment of a device-processing correction filter. Audio input is processed by a device processing module 1030 to optimize playback using two loudspeakers. In parallel, one or more microphone signals are used to analyze the acoustical performance and/or environmental properties. This may be done in an analysis module 1010, for example. The result of this analysis may for example adjust a loudspeaker correction filter that is used in the device processing stage. This may be done in in a correction filter adjustment module 1020, for example.

Examples of relevant acoustical/environmental properties that can adjust playback include:
- The absence or presence of any object potentially interfering with the reproduction of loudspeaker playback such as a hand of a user, a mobile device stand, furniture (table, desk, etc.), a mobile device cover, and alike.
- The absence or presence of distortion or other indicators of limited acoustical performance of one or more loudspeakers.

Various aspects, implementations, and aspects of the present invention may be appreciated from the following enumerated example embodiments (EEEs).

EEE1 relates to an audio processing method, comprising: receiving media input audio data and sensor data; determining device orientation, position, environment or use-case data based on received device sensor data; and generating media output audio data for loudspeaker playback based on the determined device orientation, position, environment, or use-case data.

EEE2 relates to the method of EEE1, wherein the device orientation data indicates whether the device is in a vertical orientation or horizontal orientation.

EEE3 relates to the method of EEE1 or EEE2, wherein the device orientation, position, environment, or use-case data indicate whether the device is positioned on a surface or is hand-held.

EEE4 relates to the method of any of EEE1 to EEE3, wherein the device processing uses a different processing topology based on the determined device orientation, position, environment, or use-case data.

EEE5 relates to the method of any of EEE1 to EEE4, in which the device processing includes at least one speaker correction filter, said correction filter being dependent on the determined device orientation, position, environment, or use-case data.

EEE6 relates to the method of any of EEE1 to EEE5, wherein the device processing includes at least one speaker correction filter, said speaker correction filter having a phase component intended to match the phase response to another speaker available in a device.

EEE7 relates to the method of any of EEE1 to EEE6, wherein the device processing includes at least one band-split filter to send low-frequency signal content to only one of the speakers.

EEE8 relates to the method of any of EEE1 to EEE7, wherein the processing is configured to switch to horizontal orientation, wherein the processing is based on information from a cross-talk canceller.

EEE9 relates to the method of EEE8, wherein the cross-talk canceller is bypassed for low frequencies to improve loudness.

EEE10 relates to the method of EEE8 or EEE9, wherein a center channel is extracted that bypasses the cross-talk canceller to improve the loudness of asymmetric speakers.

EEE11 relates to the method of any one of EEE1 to EEE10, wherein the acoustic performance and/or environment effect on said acoustic performance is assessed using one or more microphones, and for which said output audio data being processed in response of said acoustic performance.

EEE12 relates to the method of EEE1, wherein the device sensor data is received from at least one device sensor.

EEE13 relates to the method of EEE1, wherein the device sensor data is based on user input.

Various aspects, implementations, and aspects of dynamic equalization for cross-talk cancellation as described in WIPO Publication No. WO 2018/132417 may be appreciated from the following enumerated example embodiments (EEEs), which are not claims.

EEE1: A method of decoding a playback stream presentation from a data stream, the method comprising:
a. decoding a first playback stream presentation, the first playback stream presentation configured for reproduction on a first audio reproduction system;
b. decoding transform parameters suitable for transforming an intermediate playback stream into a second playback stream presentation, the second playback stream presentation configured for reproduction on headphones, wherein the intermediate playback stream presentation is at least one of the first playback stream presentation, a downmix of the first playback stream presentation, or an upmix of the first playback stream presentation;
c. Applying the transform parameters to the intermediate playback stream presentation to obtain the second playback stream presentation;
d. Processing the second playback stream presentation by a cross-talk cancellation algorithm to obtain a cross-talk-cancelled signal;
e. Processing the cross-talk-cancelled signal by a dynamic equalization or gain stage in which an amount of equalization or gain is dependent on a level of the first playback stream presentation or the second playback stream presentation, to produce a modified version of the cross-talk-cancelled signal; and
f. Outputting the modified version of the cross-talk-cancelled signal.

EEE2: The method of EEE1, wherein the cross-talk cancellation algorithm is based, at least in part, on loudspeaker data.

EEE3: The method of EEE2, wherein the loudspeaker data comprise loudspeaker position data.

EEE4: The method of any one of EEE1-EEE3, wherein the amount of dynamic equalization or gain is based, at least in part, on acoustic environment data.

EEE5: The method of EEE4, wherein the acoustic environment data includes data that are representative of the direct-to-reverberant ratio at the intended listening position.

EEE6: The method of EEE4 or EEE5, wherein the dynamic equalization or gain is frequency-dependent.

EEE7: The method of any one of EEE4-EEE6, wherein the acoustic environment data are frequency-dependent.

EEE8: The method of any one of EEE1-EEE7, further comprising playing back the modified version of the cross-talk-cancelled signal on headphones.

EEE9: A method for virtually rendering channel-based or object-based audio, the method comprising:
a. Receiving one or more input audio signals and data corresponding to an intended position of at least one of the input audio signals;
b. Generating a binaural signal pair for each input signal of the one or more input signals, the binaural signal pair being based on an intended position of the input signal;
c. Applying a cross-talk cancellation process to the binaural signal pair to obtain a cross-talk cancelled signal pair;
d. Measuring a level of the cross-talk cancelled signal pair;
e. Measuring a level of the input audio signals; and
f. Applying a dynamic equalization or gain to the cross-talk cancelled signal pair in response to a measured level of the cross-talk cancelled signal pair and a measured level of the input audio, to produce a modified version of the cross-talk-cancelled signal; and
g. Outputting the modified version of the cross-talk-cancelled signal.

EEE10: The method of EEE9, wherein the dynamic equalization or gain is based, at least in part, on a function of time or frequency.

EEE11: The method of EEE9 or EEE10, wherein level estimates are based, at least in part, on summing the levels across channels or objects.

EEE12: The method of EEE11, wherein levels are based at least in part, on one or more of energy, power, loudness or amplitude.

EEE13: The method of any one of EEE9-EEE12, wherein at least part of the processing is implemented in a transform or filterbank domain.

EEE14: The method of any one of EEE9-EEE13, wherein the cross-talk cancellation algorithm is based, at least in part, on loudspeaker data.

EEE15: The method of any one of EEE9-EEE14, wherein the loudspeaker data comprise loudspeaker position data.

EEE16: The method of any one of EEE 9-EEE15, wherein the amount of dynamic equalization or gain is based, at least in part, on acoustic environment data.

EEE17: The method of EEE16, wherein the acoustic environment data include data that is representative of the direct-to-reverberant ratio at the intended listening position.

EEE18: The method of EEE16 or EEE17, wherein the dynamic equalization or gain is frequency-dependent.

EEE19: The method of EEE18, wherein the acoustic environment data is frequency-dependent.

EEE20: The method of any one of EEE9-EEE19, further comprising summing the binaural signal pairs together to produce a summed binaural signal pair, wherein the cross-talk cancellation process is applied to the summed binaural signal pair.

EEE21: A non-transitory medium having software stored thereon, the software including instructions for performing a method of decoding a playback stream presentation from a data stream, the method comprising:
decoding a first playback stream presentation, the first playback stream presentation configured for reproduction on a first audio reproduction system;
decoding transform parameters suitable for transforming an intermediate playback stream into a second playback stream presentation, the second playback stream presentation configured for reproduction on headphones, wherein the intermediate playback stream presentation is at least one of the first playback stream presentation, a downmix of the first playback stream presentation, or an upmix of the first playback stream presentation;
applying the transform parameters to the intermediate playback stream presentation to obtain the second playback stream presentation;
processing the second playback stream presentation by a cross-talk cancellation algorithm to obtain a cross-talk-cancelled signal;
processing the cross-talk-cancelled signal by a dynamic equalization or gain stage in which an amount of equalization or gain is dependent on a level of the first playback stream presentation or the second playback stream presentation, to produce a modified version of the cross-talk-cancelled signal; and
outputting the modified version of the cross-talk-cancelled signal.

EEE22: The non-transitory medium of EEE21, wherein the cross-talk cancellation algorithm is based, at least in part, on loudspeaker data.

EEE23: The non-transitory medium of EEE22, wherein the loudspeaker data comprise loudspeaker position data.

EEE24: The non-transitory medium of any one of EEE21-EEE23, wherein the amount of dynamic equalization or gain is based, at least in part, on acoustic environment data.

EEE25: The non-transitory medium of EEE24, wherein the acoustic environment data includes data that is representative of the direct-to-reverberant ratio at the intended listening position.

EEE26: The non-transitory medium of EEE24 or EEE25, wherein the dynamic equalization or gain is frequency-dependent.

EEE27: The non-transitory medium of any one of EEE24-EEE26, wherein the acoustic environment data is frequency-dependent.

EEE28: The non-transitory medium of any one of EEE21-EEE27, further comprising playing back the modified version of the cross-talk-cancelled signal on headphones.

EEE29: A non-transitory medium having software stored thereon, the software including instructions for performing a method of virtually rendering channel-based or object-based audio, the method comprising:
receiving one or more input audio signals and data corresponding to an intended position of at least one of the input audio signals;
generating a binaural signal pair for each input signal of the one or more input signals, the binaural signal pair being based on an intended position of the input signal;
applying a cross-talk cancellation process to the binaural signal pair to obtain a cross-talk cancelled signal pair;
measuring a level of the cross-talk cancelled signal pair;
measuring a level of the input audio signals;
applying a dynamic equalization or gain to the cross-talk cancelled signal pair in response to a measured level of the cross-talk cancelled signal pair and a measured level of the input audio, to produce a modified version of the cross-talk-cancelled signal; and outputting the modified version of the cross-talk-cancelled signal.

EEE30: The non-transitory medium of EEE29, wherein the dynamic equalization or gain is based, at least in part, on a function of time or frequency.

EEE31: The non-transitory medium of EEE29 or EEE30, wherein level estimates are based, at least in part, on summing the levels across channels or objects.

EEE32: The non-transitory medium of EEE31, wherein levels are based at least in part, on one or more of energy, power, loudness or amplitude.

EEE33: The non-transitory medium of any one of EEE29-EEE32, wherein at least part of the processing is implemented in a transform or filterbank domain.

EEE34: The non-transitory medium of any one of EEE29-EEE33, wherein the cross-talk cancellation algorithm is based, at least in part, on loudspeaker data.

EEE35: The non-transitory medium of any one of EEE29-EEE34, wherein the loudspeaker data comprise loudspeaker position data.

EEE36: The non-transitory medium of any one of EEE32-EEE35, wherein the amount of dynamic equalization or gain is based, at least in part, on acoustic environment data.

EEE37: The non-transitory medium of EEE36, wherein the acoustic environment data includes data that is representative of the direct-to-reverberant ratio at the intended listening position.

EEE38: The non-transitory medium of EEE36 or EEE37, wherein the dynamic equalization or gain is frequency-dependent.

EEE39: The non-transitory medium of EEE38, wherein the acoustic environment data is frequency-dependent.

EEE40: The non-transitory medium of any one of EEE29-EEE39, further comprising summing the binaural signal pairs together to produce a summed binaural signal pair, wherein the cross-talk cancellation process is applied to the summed binaural signal pair.

EEE41: An apparatus, comprising:
an interface system; and
a control system configured for:
  decoding a first playback stream presentation received via the interface system, the first playback stream presentation configured for reproduction on a first audio reproduction system;
  decoding transform parameters received via the interface system, the transform parameters suitable for transforming an intermediate playback stream into a second playback stream presentation, the second playback stream presentation configured for reproduction on headphones, wherein the intermediate playback stream presentation is at least one of the first playback stream presentation, a downmix of the first playback stream presentation, or an upmix of the first playback stream presentation;
  applying the transform parameters to the intermediate playback stream presentation to obtain the second playback stream presentation;
  processing the second playback stream presentation by a cross-talk cancellation algorithm to obtain a cross-talk-cancelled signal;
  processing the cross-talk-cancelled signal by a dynamic equalization or gain stage in which an amount of equalization or gain is dependent on a level of the first playback stream presentation or the second playback stream presentation, to produce a modified version of the cross-talk-cancelled signal; and
  outputting, via the interface system, a modified version of the cross-talk-cancelled signal.

EEE42: The apparatus of EEE41, wherein the cross-talk cancellation algorithm is based, at least in part, on loudspeaker data.

EEE43: The apparatus of EEE42, wherein the loudspeaker data comprise loudspeaker position data.

EEE44: The apparatus of any one of EEE41-EEE43, wherein the amount of dynamic equalization or gain is based, at least in part, on acoustic environment data.

EEE45: The apparatus of EEE44, wherein the acoustic environment data includes data that is representative of the direct-to-reverberant ratio at the intended listening position.

EEE46: The apparatus of EEE44 or EEE45, wherein the dynamic equalization or gain is frequency-dependent.

EEE47: The apparatus of any one of EEE44-EEE46, wherein the acoustic environment data is frequency-dependent.

EEE48: The apparatus of any one of EEE41-EEE47, further comprising headphones, wherein the control system is further configured for playing back the modified version of the cross-talk-cancelled signal on the headphones.

EEE49: An apparatus, comprising:
an interface system; and
a control system configured for:
  receiving one or more input audio signals and data corresponding to an intended position of at least one of the input audio signals;
  generating a binaural signal pair for each input signal of the one or more input signals, the binaural signal pair being based on an intended position of the input signal;
  applying a cross-talk cancellation process to the binaural signal pair to obtain a cross-talk cancelled signal pair;
  measuring a level of the cross-talk cancelled signal pair;
  measuring a level of the input audio signals;
  applying a dynamic equalization or gain to the cross-talk cancelled signal pair in response to a measured level of the cross-talk cancelled signal pair and a measured level of the input audio, to produce a modified version of the cross-talk-cancelled signal; and outputting, via the interface system, a modified version of the cross-talk-cancelled signal.

EEE50: The apparatus of EEE49, wherein the dynamic equalization or gain is based, at least in part, on a function of time or frequency.

EEE51: The apparatus of EEE49 or EEE50, wherein level estimates are based, at least in part, on summing the levels across channels or objects.

EEE52: The apparatus of EEE51, wherein levels are based at least in part, on one or more of energy, power, loudness or amplitude.

EEE53: The apparatus of any one of EEE49-EEE52, wherein at least part of the processing is implemented in a transform or filterbank domain.

EEE54: The apparatus of any one of EEE49-EEE53, wherein the cross-talk cancellation algorithm is based, at least in part, on loudspeaker data.

EEE55: The apparatus of any one of EEE49-EEE54, wherein the loudspeaker data comprise loudspeaker position data.

EEE56: The apparatus of any one of EEE52-EEE55, wherein the amount of dynamic equalization or gain is based, at least in part, on acoustic environment data.

EEE57: The apparatus of EEE56, wherein the acoustic environment data includes data that is representative of the direct-to-reverberant ratio at the intended listening position.

EEE58: The apparatus of EEE56 or EEE57, wherein the dynamic equalization or gain is frequency-dependent.

EEE59: The apparatus of EEE58, wherein the acoustic environment data is frequency-dependent.

EEE60: The apparatus of any one of EEE49-EEE59, wherein the control system is further configured for summing the binaural signal pairs together to produce a summed binaural signal pair, wherein the cross-talk cancellation process is applied to the summed binaural signal pair.

EEE61: An apparatus, comprising:
means for receiving a first playback stream presentation and transform parameters;
means for:
decoding the first playback stream presentation, the first playback stream presentation being configured for reproduction on a first audio reproduction system;
decoding the transform parameters, the transform parameters being suitable for transforming an intermediate playback stream into a second playback stream presentation, the second playback stream presentation configured for reproduction on headphones, wherein the intermediate playback stream presentation is at least one of the first playback stream presentation, a downmix of the first playback stream presentation, or an upmix of the first playback stream presentation;
applying the transform parameters to the intermediate playback stream presentation to obtain the second playback stream presentation;
processing the second playback stream presentation by a cross-talk cancellation algorithm to obtain a cross-talk-cancelled signal; and
processing the cross-talk-cancelled signal by a dynamic equalization or gain stage in which an amount of equalization or gain is dependent on a level of the first playback stream presentation or the second playback stream presentation, to produce a modified version of the cross-talk-cancelled signal; and
means for outputting the modified version of the cross-talk-cancelled signal.

EEE62: The apparatus of EEE61, wherein the cross-talk cancellation algorithm is based, at least in part, on loudspeaker data.

EEE63: The apparatus of EEE62, wherein the loudspeaker data comprise loudspeaker position data.

EEE64: The apparatus of any one of EEE61-EEE63, wherein the amount of dynamic equalization or gain is based, at least in part, on acoustic environment data.

EEE65: An apparatus, comprising:
means for receiving a plurality of input audio signals and data corresponding to an intended position of at least some of the input audio signals;
means for:
generating a binaural signal pair for each input signal of the plurality of input signals, the binaural signal pair being based on an intended position of the input signal;
applying a cross-talk cancellation process to the binaural signal pair to obtain a cross-talk cancelled signal pair;
measuring a level of the cross-talk cancelled signal pair;
measuring a level of the input audio signals; and
applying a dynamic equalization or gain to the cross-talk cancelled signal pair in response to a measured level of the cross-talk cancelled signal pair and a measured level of the input audio, to produce a modified version of the cross-talk-cancelled signal; and
means for outputting the modified version of the cross-talk-cancelled signal.

EEE66: The apparatus of EEE65, wherein the dynamic equalization or gain is based, at least in part, on a function of time or frequency.

EEE67: The apparatus of EEE65 or EEE66, wherein level estimates are based, at least in part, on summing the levels across channels or objects.

EEE68: The apparatus of EEE67, wherein levels are based at least in part, on one or more of energy, power, loudness or amplitude.

EEE69: The apparatus of any one of EEE65-EEE68, wherein the cross-talk cancellation algorithm is based, at least in part, on loudspeaker data.

EEE70: The apparatus of any one of EEE65-EEE69, further comprising means for summing the binaural signal pairs together to produce a summed binaural signal pair, wherein the cross-talk cancellation process is applied to the summed binaural signal pair.

The invention claimed is:

1. A method of processing audio data for replay on a mobile device with a first speaker and a second speaker, wherein the audio data comprises a respective audio signal for each of the first and second speakers, the method comprising:
determining a device orientation of the mobile device;
if the determined device orientation is vertical orientation, applying a first processing mode to the audio signals for the first and second speakers; and
if the determined device orientation is horizontal orientation, applying a second processing mode to the audio signals for the first and second speakers,
wherein applying the first processing mode involves:
determining respective mono audio signals in at least two frequency bands based on the audio signals for the first and second speakers;
in a first one of the at least two frequency bands, routing a larger portion of the respective mono audio signal to one of the first and second speakers; and
in a second one of the at least two frequency bands, routing a larger portion of the respective mono audio signal to the other one of the first and second speakers; and
wherein applying the second processing mode involves:
applying cross-talk cancellation to the audio signals for the first and second speakers.

2. The method according to claim 1, wherein the second processing mode further involves applying a multi-band dynamic range compressor, peak limiter, RMS limiter, or signal limiter to the audio signals after cross-talk cancellation.

3. The method according to claim 2, wherein applying the multi-band dynamic range compressor, peak limiter, RMS limiter, or signal limiter to the audio signals after cross-talk cancellation involves applying gains that are coupled between respective audio signals after cross-talk cancellation, at least over a range of frequencies.

4. The method according to claim 1, wherein the second processing mode involves bypassing cross-talk cancellation for low frequencies.

5. The method according to claim 4, wherein bypassing cross-talk cancellation for low frequencies involves:
determining a mono audio signal in a low frequency band based on the audio signals for the first and second speakers; and
routing the mono audio signal in the low frequency band to a main speaker among the first and second speakers.

6. The method according to claim 1, wherein the second processing mode involves:
applying a first correction filter to that audio signal after cross-talk cancellation that is routed to the one of the first and second speakers; and applying a second correction filter to that audio signal after cross-talk cancellation that is routed to the other one of the first and second speakers, wherein the first correction filter is different from the second correction filter.

7. The method according to claim 1, wherein the second processing mode involves:
extracting a center channel from the audio signals for the first and second speakers; and
bypassing cross-talk cancellation for the extracted center channel.

8. The method according to claim 1, wherein in the first processing mode, determining the respective mono audio signals in the at least two frequency bands involves:
downmixing the audio signals for the first and second speakers to a mono audio signal and splitting the mono audio signal into at least two frequency bands; or
splitting each audio signal into at least two frequency bands and, in each frequency band, downmixing the respective audio signals to a respective mono audio signal.

9. The method according to claim 1, wherein the first processing mode involves:
applying a first correction filter to that part of the mono audio signal in the first one of the at least two frequency bands that is routed to the one of the first and second speakers; and
applying a second correction filter to that part of the mono audio signal in the second one of the at least two frequency bands that is routed to the other one of the first and second speakers,
wherein the first correction filter is different from the second correction filter.

10. The method according to claim 9, wherein the first processing mode involves applying a multi-band dynamic range compressor, peak limiter, RMS limiter, or signal limiter to the audio signals after filtering by the first and second correction filters.

11. The method according to claim 1, wherein in the first processing mode, the first one of the at least two frequency bands is a low frequency band and the mono audio signal in the low frequency band is routed only to the one of the first and second speakers.

12. The method according to claim 11, wherein the one of the first and second speakers is a main speaker of the mobile device.

13. The method according to claim 1, wherein in the first processing mode, the second one of the at least two frequency bands is a high frequency band, and wherein the mono audio signal in the high frequency band is routed only to the other one of the first and second speakers.

14. The method according to claim 13, wherein the other one of the first and second speakers is an ear speaker of the mobile device.

15. The method according to claim 1, further comprising:
for at least one of the first and second speakers, applying a speaker correction filter to the respective audio signal that is routed to that speaker, wherein the speaker correction filter has a phase component intended to match the phase response of that speaker to the phase response of the other one of the first and second speakers.

16. The method according to claim 1, further comprising:
obtaining sensor data from one or more sensors of the mobile device; and
determining the device orientation based on the sensor data.

17. The method according to claim 1, further comprising:
obtaining a user input;
determining the device orientation based on the user input.

18. The method according to claim 1, wherein the mobile device is a mobile phone, the first speaker is a main speaker of the mobile phone, and the second speaker is an ear speaker of the mobile phone.

19. A non-transitory computer-readable storage medium storing a computer program including instructions that causes a processor that carries out the instructions to perform the method according to claim 1.

20. A mobile device comprising:
a first speaker and a second speaker; and
a processor coupled to a memory storing instructions for the processor,
wherein the processor is adapted to perform a method of processing audio data for replay on the mobile device with the first speaker and the second speaker, wherein the audio data comprises a respective audio signal for each of the first and second speakers, the method comprising:
determining a device orientation of the mobile device;
if the determined device orientation is vertical orientation, applying a first processing mode to the audio signals for the first and second speakers; and
if the determined device orientation is horizontal orientation, applying a second processing mode to the audio signals for the first and second speakers,
wherein the applying the first processing mode involves:
determining respective mono audio signals in at least two frequency bands based on the audio signals for the first and second speakers;
in a first one of the at least two frequency bands, routing a larger portion of the respective mono audio signal to one of the first and second speakers; and
in a second one of the at least two frequency bands, routing a larger portion of the respective mono audio signal to the other one of the first and second speakers; and
wherein applying the second processing mode involves applying cross-talk cancellation to the audio signals for the first and second speakers.

* * * * *